(12) United States Patent
Ray

(10) Patent No.: US 8,800,050 B2
(45) Date of Patent: Aug. 5, 2014

(54) SECURITY SYSTEM FOR COMPUTING RESOURCES PRE-RELEASES

(75) Inventor: Kenneth Ray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 592 days.

(21) Appl. No.: 12/942,987

(22) Filed: Nov. 9, 2010

(65) Prior Publication Data

US 2012/0117625 A1    May 10, 2012

(51) Int. Cl.
*G06F 21/57*    (2013.01)
*G06F 21/73*    (2013.01)

(52) U.S. Cl.
USPC .............. 726/26; 713/166; 713/167; 726/21; 726/27

(58) Field of Classification Search
USPC ......... 713/176, 166, 167; 726/4–9, 26–31, 21
See application file for complete search history.

(56) References Cited

U.S. PATENT DOCUMENTS

| | | | |
|---|---|---|---|
| 6,014,666 A * | 1/2000 | Helland et al. ........................ 1/1 |
| 6,851,054 B2 * | 2/2005 | Wheeler et al. ............... 713/176 |
| 7,047,416 B2 * | 5/2006 | Wheeler et al. ............... 713/182 |
| 7,313,791 B1 * | 12/2007 | Chen et al. .................... 717/170 |
| 7,467,404 B2 | 12/2008 | McAllister et al. |
| 7,536,172 B2 * | 5/2009 | Minear et al. ................. 455/410 |
| 7,660,769 B2 | 2/2010 | Shimizu |
| 7,908,646 B1 * | 3/2011 | Chen et al. ........................ 726/4 |
| 8,374,386 B2 * | 2/2013 | Bayram et al. ................ 382/100 |
| 2006/0211490 A1 | 9/2006 | Falvey et al. |
| 2007/0184905 A1 | 8/2007 | Gatto et al. |
| 2010/0099500 A1 | 4/2010 | Walker et al. |

FOREIGN PATENT DOCUMENTS

CN    101447011 A    6/2009

OTHER PUBLICATIONS

Sheffield, Brandon. "OnLive Opens Beta For Cloud Computing Game Service." Gamasutra [online], Sep. 2, 2009 [retrieved on Aug. 4, 2010], pp. 1-2. Retrieved from the Internet: <URL: http://www.gamasutra.com/phpbin/news_index.php?story=25130>.
"Software Protection with ROCKEY4 Software Dongle." "Rockey.com.my: The Key to Software Development Success, What is ROCKEY4?" [online]. Retrieved on Aug. 4, 2010, pp. 1-5. Retrieved from the Internet: <URL: http:// rockey.com.my/prod-dongle-rockey4.php>.
Office Action dated Mar. 5, 2014 in Chinese Patent Application No. 201110375180.8, with English language Summary, 15 pages.
English Abstract of Chinese Patent Application No. 20081178708, CN101447011A, 2 pages.

* cited by examiner

*Primary Examiner* — Saleh Najjar
*Assistant Examiner* — Feliciano Mejia
(74) *Attorney, Agent, or Firm* — Tony Azure; Sade Fashokun; Micky Minhas

(57) ABSTRACT

Technology is provided for provisioning a user computer system with membership in a privilege set in order to execute a pre-release resource. Some examples of pre-release resources are alpha and beta versions of firmware or software which can be downloaded to user computer systems. The pre-release resources are associated with different privilege sets based on their security risk levels. In one example, a security risk level may represent a number of user computer systems at risk of an integrity failure of the pre-release resource. In other examples, the security risk may represent an operational layer of the user computer system affected by the resource or a level of security testing certification success for the pre-release resource. A privilege set identifier indicates membership in one or more privilege sets.

17 Claims, 15 Drawing Sheets

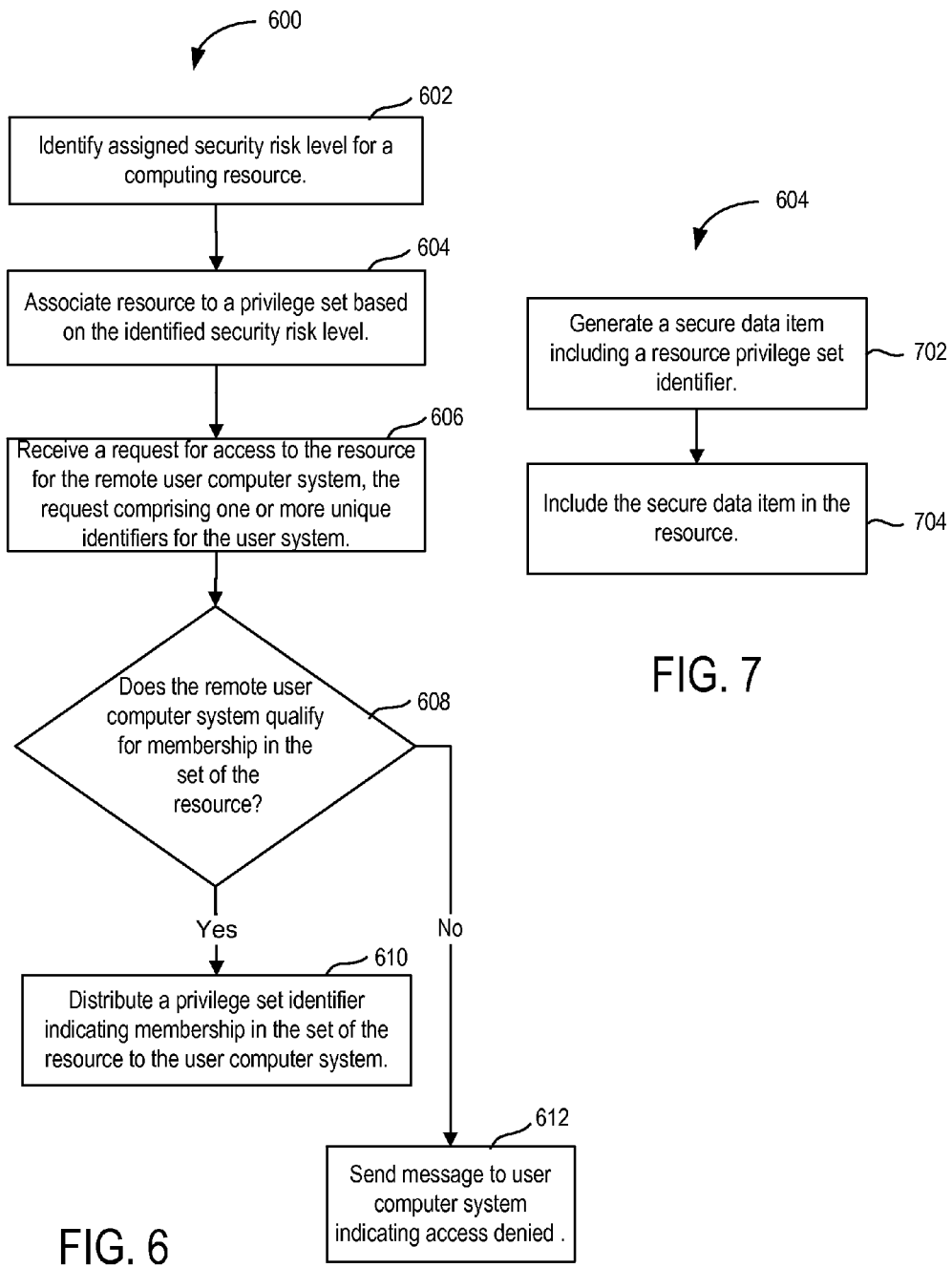

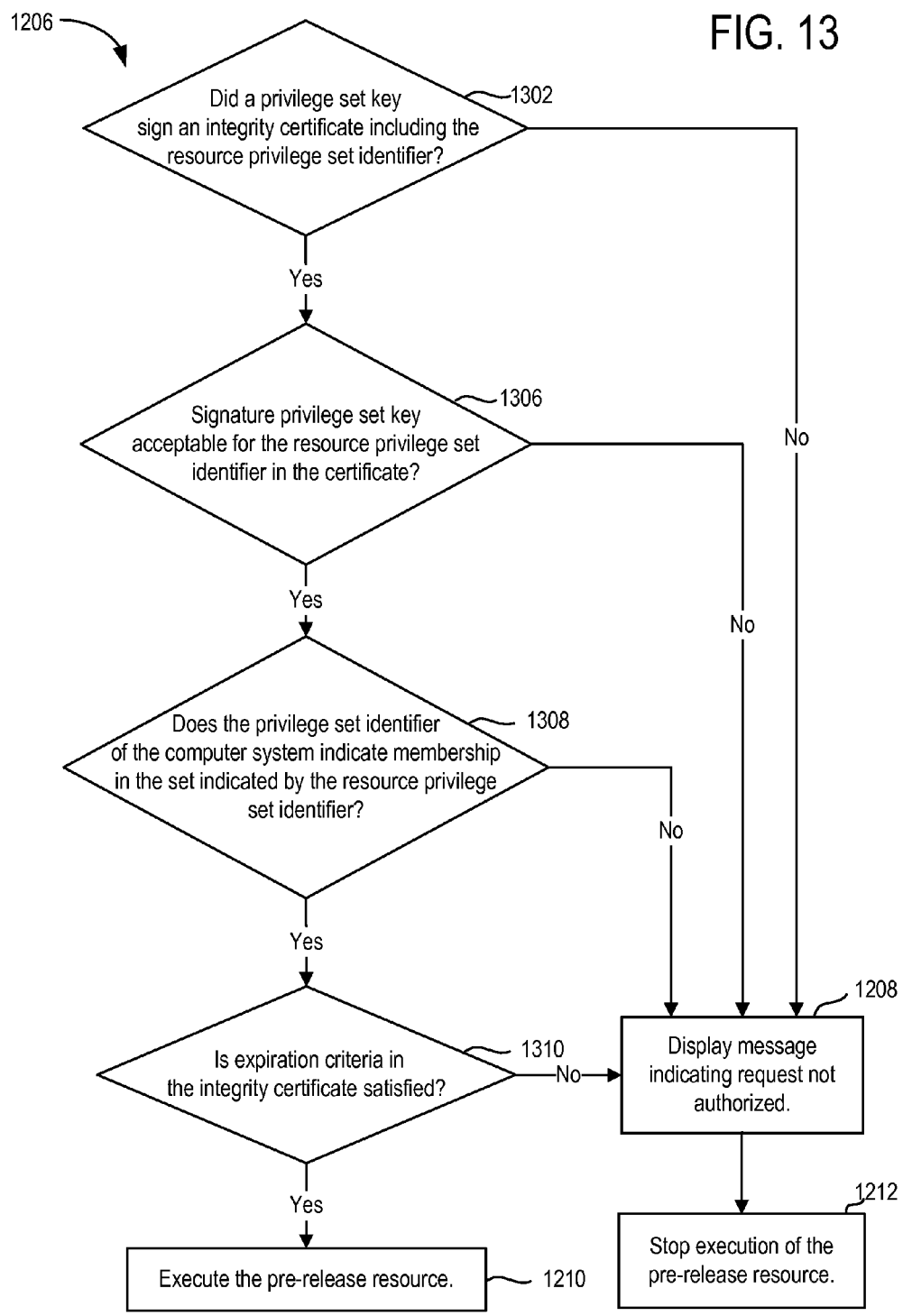

SECURITY SYSTEM FOR COMPUTING RESOURCES PRE-RELEASES

BACKGROUND

The creators of many computing devices build them to only run very specific, well defined computing resources, such as code embodied in software or firmware, greatly restricting, including completely restricting, the type and kind of resources an end user may run on them. Some examples of such devices are mobile devices and gaming consoles like the iPhone®, Sony Playstation®, Xbox 360®, and Windows Phone 7®. Maintaining control of the code that runs on these systems is an integral part of the efficient operation of and user experience provided by these devices.

An important part of the process of distributing prototypes or pre-releases of computing resources, such as code for upgrades or new functionality embodied in software or firmware, to customers is proper validation of software which takes time, and delays the release of new or improved prototypes for testing by customers. For example, a party which creates software games to run on a certain type of gaming console may want to pre-release different versions of a game to see which is most popular. In another example, a party may want to make available a prototype upgrade as soon as possible to keep up with a competitor's release.

SUMMARY

Technology is provided for accessing a pre-release computing resource associated with a privilege set by a user computer system. A pre-release computing resource has not received a full amount of validation testing as would a release to the general public where the expectation of safety to run is very high on any user computer system for which the resource is targeted. Some examples of pre-release resources are alpha and beta versions of firmware, boot code, hypervisor, system code, third party drivers, third party software, or other software that may run on the user computer system which is to be protected.

A privilege set includes as members a set of pre-release resources and a set of user computer systems with permission or privilege to access the set of pre-release resources. The pre-release resources are associated with different privilege sets based on their security risk levels. Some examples of factors used in determining a security risk level include a limit on the number of user computer systems at risk of an integrity failure of the pre-release resource, an operational layer of the user computer system affected by the resource and a level of security testing certification success for the pre-release resource. A user computer system satisfies membership criteria to be in the privilege set. One example of membership criteria is whether the limit on the number of user computer systems in the set has been reached. In another example, a user computer system must possess a required resource, for example, a version of system software. Additionally, the privilege sets can be in a hierarchy wherein membership in a higher privileged set gives membership in lower privileged sets.

In one embodiment, a method for accessing a pre-release computing resource associated with a privilege set comprises provisioning a user computer system for membership in the privilege set with a privilege set identifier. Membership in the privilege set required for the resource is verified based upon the privilege set identifier and a resource privilege set identifier for the resource.

In one embodiment, the user computer system comprises a processor which has access to a communication interface and a memory. The communication interface allows the processor to communicate with a software pre-release computer system. The memory stores software for programming the processor to obtain a privilege set identifier from the software pre-release computer system and to store the identifier in the memory. Additionally, the processor downloads a software pre-release associated with a privilege set over the communication interface. The memory further stores the software pre-release. In one example, the software pre-release includes code for verifying the user computer system has membership in the privilege set associated with the release based on the privilege set identifier. If the user computer system lacks membership, the software pre-release does not execute further.

The technology provides for embodiments of automatic provisioning of privilege sets. The privilege sets may be in a hierarchy based on security risk levels. In one example, a privilege set of a higher privilege has membership in lower privileged sets as well. In one embodiment, a method comprises associating a pre-release computing resource with a privilege set by generating a resource privilege set identifier for the resource. Responsive to satisfaction of membership criteria for the privilege set, a privilege set identifier granting membership is generated for a user computer system.

The privilege set identifier and the pre-release resource are distributed to the user computer system. The resource is non-executable for user computer systems lacking membership in the privilege set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a flowchart of an embodiment of a method for automatically provisioning privilege sets.

FIG. 7 is a flowchart of an embodiment of a method for associating a resource to a privilege set.

FIG. 13 is a flowchart of another embodiment of a method for determining whether a user computer system and a pre-release resource share membership in the same set.

DETAILED DESCRIPTION

Figure 1A:
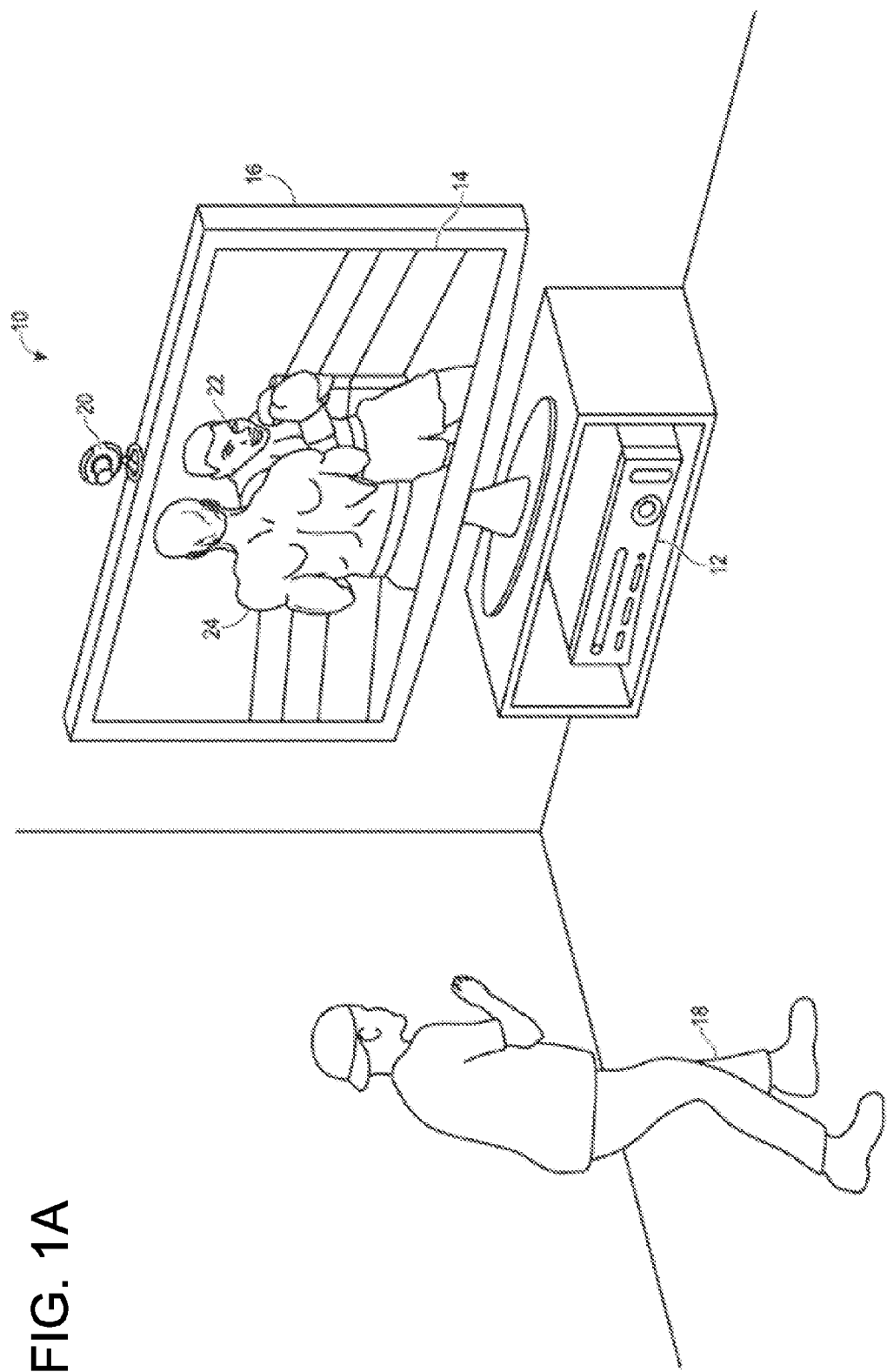
FIG. 1A illustrates an example embodiment of a target recognition, analysis, and tracking system with users participating in a game.

The technology provides embodiments of a security model for provisioning privilege sets to control security risks associated with pre-release computing resources while obtaining benefits from fast prototyping. By restricting the use of code to a specific set of systems, a careful balance can be maintained between the risks of omitting entirely or using abbreviated validation checking and the advantages of allowing code to run on systems sooner.

A number of factors contribute to the security risk of pre-releasing a resource. One example is the level of validation testing for computer security issues. Several security tests are performed in integrity checking to verify that the release is resilient to security threats. Some examples of security tests are threat modeling, pen testing, fuzz-testing, and data flow verification. If a pre-release resource passes a certain number of tests or types of tests, the resource can be assigned a level of security testing certification success. This level is less than a full certification but provides a baseline for risk assessment. For example, successful test results may qualify a computing resource for an integrity certification indicating a level of protection from certain risks.

Other factors contributing to the level of security testing certification success assigned can be the resource's operation has not been completely tested or has not been tested in different scenarios to verify it operates as intended. Since many security vulnerabilities come from unstable code, general testing for and general stability in a user computer system greatly contributes to the overall resilience of the user computer system (e.g. phone or console). Hackers can compromise software or firmware with viruses and malware such as Trojan horses and backdoors. The risks of a compromised resource vary, but can be substantial. In one example, compromised software can result in disabling licensing checks so pirated versions of software can execute in a computer system. In another example, a dedicated computer system such as a game console can be repurposed to run software not intended for the console.

Any poorly written code that inadvertently relies on correct behavior of hardware, on formatting of data read from storage, or from the network, may result in an exploit used by an attacker. Furthermore, the local user of the hardware may attack the user computer system such as a game console through a variety of means. For example, the user can connect the system to user-accessible and non-user accessible buses, and send malformed data through these buses. Simple and complex changes to hardware can cause the user computer system to receive malformed data. The hardware memory can be directly attacked and malformed data files created in flash or on a drive. Even networking devices can be effected to affect the networking of the user computer system. For example, changes can be made to upstream routers and network address translation (NAT) devices which affect Dynamic Host Configuration Protocol (DHCP) and Domain Name System (DNS) protocols.

Another risk factor is how many user computer systems are going to receive the pre-release resource. In other words, what is the size of the risk pool. Any exploit found in less then a fully validated resource (e.g. software) would therefore only have an impact, business impact as well as user experience impact, proportional to the number of user computer systems on which it runs. Additionally, in some embodiments, the more risky the computing resource and the fewer validation checks applied to that resource, the smaller the privilege set of user computer systems to which that resource is restricted. The technology provides provisioning of privilege sets which scales with audience size.

Another risk factor is the functionality of the operational layer of the user computer system that will be changed by the pre-released resource. For example, in a multimedia console 100 like the one discussed in FIG. 2A below, a pre-release update to a firmware driver in an audio processing unit 123 with an error or a piece of malware may interfere with smooth execution or the user experience of a 3D real-time game application. Although undesirable, that would not be as bad as a software pre-release of a new hypervisor with a backdoor which lets a hacker corrupt the hypervisor and thus effect widespread operation of most of the multimedia console 100.

By provisioning the pre-release resources to have membership in privilege sets and granting membership in those privilege sets to user computer systems, the technology provides a security model which balances protection against security risks with the needs of fast prototyping. In most embodiments, provisioning and verification of membership in a privilege set having a security risk level is independent of licensing the pre-release resource. In other words, a user computer system may have the privilege to execute a pre-release resource for security purposes, but still needs to obtain a license to execute the pre-release.

FIG. 1A provides a contextual example in which the present technology can be useful. FIG. 1A illustrates an example embodiment of a target recognition, analysis, and tracking system. The target recognition, analysis, and tracking system 10 may be used to recognize, analyze, and/or track a human target such as the user 18. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 for capturing positions and movements performed by the user in 3D, which the computing environment 12 receives, interprets and uses to control the gaming or other application.

Embodiments of the computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes one or more capture devices 20 for capturing image data relating to one or more users and/or objects sensed by the capture device. In embodiments, the capture device 20 may be used to capture information relating to movements and gestures of one or more users, which information is received by the computing environment and used to render, interact with and/or control aspects of a gaming or other application. Examples of the computing environment 12 and capture device 20 are explained in greater detail below.

Embodiments of the target recognition, analysis, and tracking system 10 may be connected to an audio/visual device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In an example embodiment, the application executing on the computing environment 12 may be a game with real time interaction such as a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, the user 18 may throw a punch in physical space to cause the player avatar 24 to throw a punch in game space. Thus, according to an example embodiment, the capture device 20 captures a 3D representation of the punch in physical space using the technology described herein. A processor (see FIG. 1B) in the capture device 20 and the computing environment 12 of the target recognition, analysis, and tracking system 10 may be used to recognize and analyze the punch of the user 18 in physical space such that the punch may be interpreted as a gesture or game control of the player avatar 24 in game space and in real time.

Figure 1B:
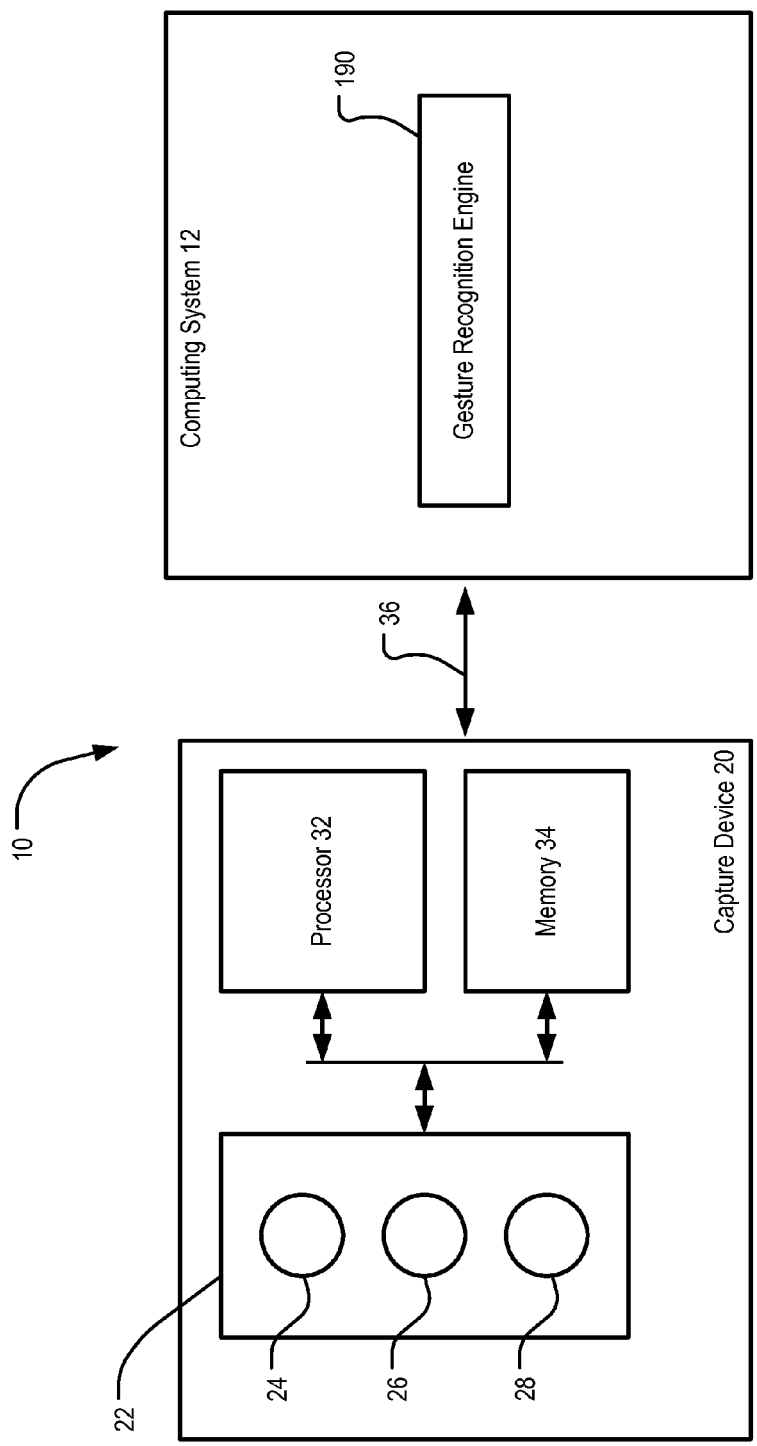
FIG. 1B illustrates a block diagram view of an exemplar capture device which may be used in the target recognition, analysis, and tracking system in which embodiments of the technology can operate.

FIG. 1B illustrates a block diagram view of an example of a capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 1B, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors on a photosurface of cameras 26 and/or 28 to detect the backscattered light from the surface of one or more targets and objects in the scene.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 1B, in one embodiment, the memory component 34 may be a separate component in communication with the image camera component 22 and the processor 32. According to another embodiment, the memory component 34 may be integrated into the processor 32 and/or the image camera component 22.

As shown in FIG. 1B, the capture device 20 may communicate with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various body parts on that user's skeleton. Other techniques include transforming the image into a body model representation of the person and transforming the image into a mesh model representation of the person.

The skeletal model may then be provided to the computing environment 12 such that the computing environment may track the skeletal model and render an avatar associated with the skeletal model. Under the control of gesture recognition engine software 190, the computing environment 12 may further determine which controls to perform in an application executing on the computer environment based on, for example, gestures of the user that have been recognized from three dimensional movement of parts of the skeletal model.

Figure 2A:
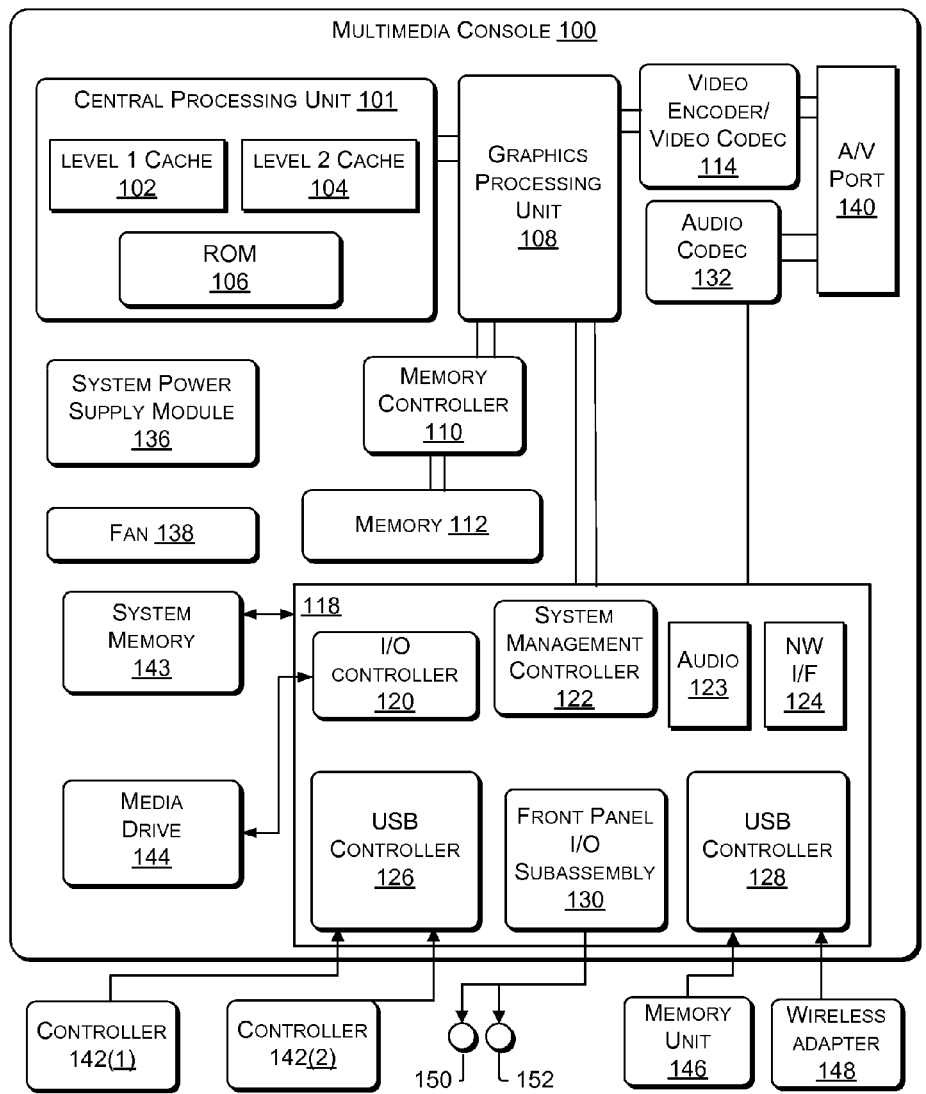
FIG. 2A illustrates an example embodiment of a user computer system which may be a computing environment in which embodiments of the technology can operate.

FIG. 2A illustrates an example embodiment of a user computer system which may be a computing environment that may be used in a target recognition, analysis, and tracking system like that shown in FIGS. 1A and 1B. The computing environment 12 may be a multimedia console 100, such as a gaming console. As shown in FIG. 2A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an NV (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the NV port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The ROM 106, caches 102, 104, memory 112, system memory 143, memory unit 146 and media drive 144 are examples of computer readable storage media, which are discussed further below.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 2B:
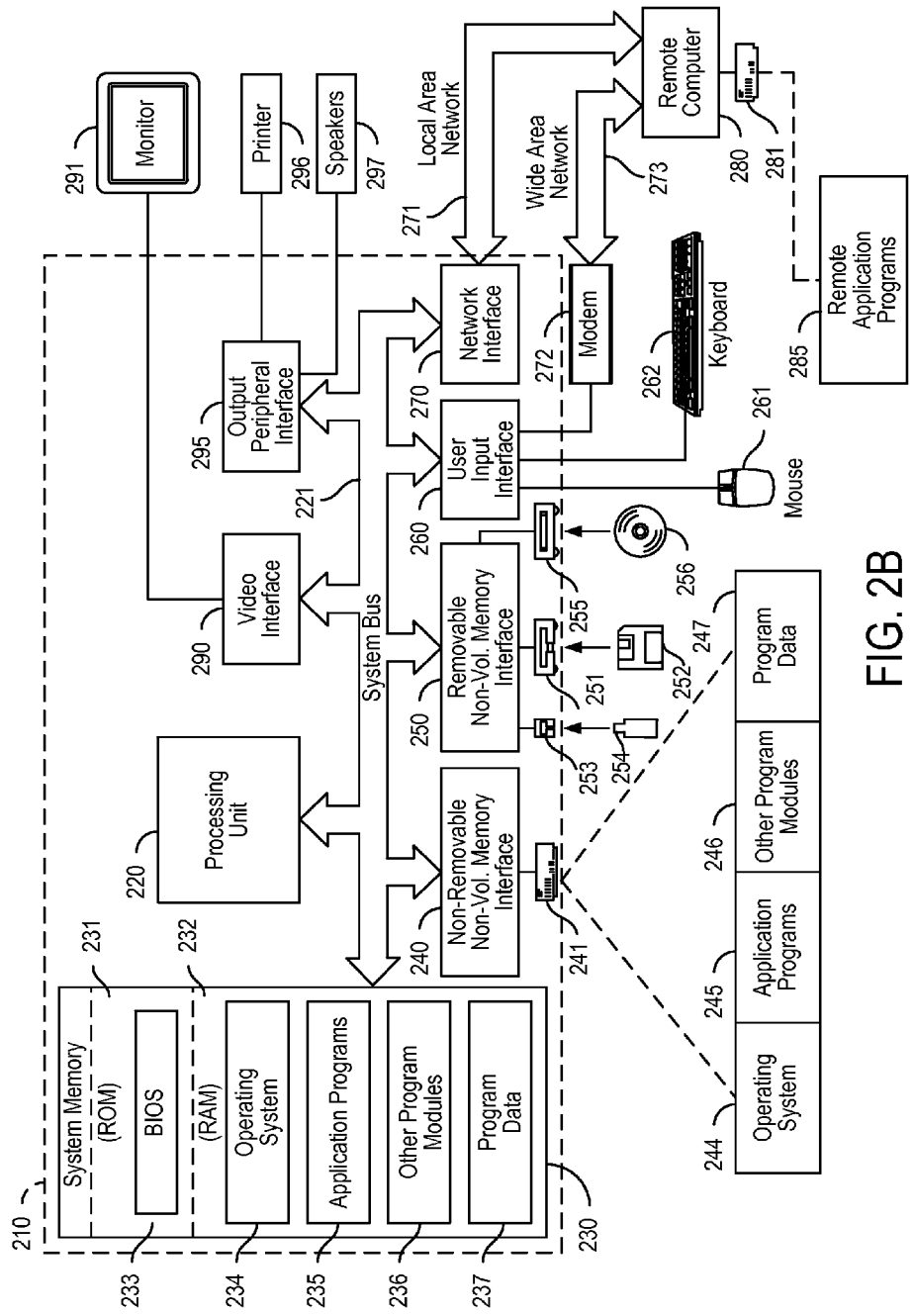
FIG. 2B illustrates another example embodiment of a user computer system which may be a computing environment in which embodiments of the technology can operate.

FIG. 2B illustrates another example embodiment of a user computer system which may be a computing environment 210 including a personal computer that may be the computing environment 12 shown in FIGS. 1A-1B used in a target recognition, analysis, and tracking system 10. The computing system environment 210 is only one example of a suitable computing environment and is not intended to suggest any limitation as to the scope of use or functionality of the presently disclosed subject matter. Neither should the computing environment 210 be interpreted as having any dependency or requirement relating to any one or combination of components illustrated in the exemplary operating environment 210.

With reference to FIG. 2B, an exemplary system for implementing the technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, memory sticks or cards, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2B illustrates operating system 234, application programs 235, other program modules 236, and program data 237.

The computer 210 may also include other removable/non-removable, volatile/nonvolatile computer storage media. By way of example only, FIG. 2B illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Additionally, FIG. 2B illustrates a removable media drive 253 that reads or writes to a removable memory stick 254 or removable memory card 254. In some examples, the memory card may be a flash memory card or stick. Other removable/non-removable, volatile/nonvolatile computer storage media that can be used in the exemplary operating environment include, but are not limited to, magnetic tape cassettes, flash memory, digital versatile disks, digital video tape, solid state RAM, solid state ROM, and the like. The hard disk drive 241 is typically connected to the system bus 221 through an non-removable memory interface such as interface 240, and magnetic disk drive 251, removable media drive 253, and optical disk drive 255 are typically connected to the system bus 221 by a removable memory interface, such as interface 250.

The drives and their associated computer storage media discussed above and illustrated in FIG. 2B, provide storage of computer readable instructions, data structures, program modules and other data for the computer 210. In FIG. 2B, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2B. The logical connections depicted in FIG. 2B include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2B illustrates remote application programs 285 as residing on memory device 281. It will be appreciated that the network connections shown are exemplary and other means of establishing a communications link between the computers may be used.

FIGS. 3A through 5B illustrate some examples of software modules or software sub-components which may exist in either a computer system which authorizes membership in a privilege set or on a user computer system that may potentially be part of a privilege set. As mentioned below, the particular naming and division of modules, routines, features, attributes, methodologies and other aspects are not mandatory, and the mechanisms that implement the technology or its features may have different names, divisions and/or formats.

Software or firmware for provisioning and verifying membership in a privilege set may be located in one or more operational layers of the computer system as different pre-release resources are loaded or recognized at different points of time in the start-up and operation of a computer system. Not all operational layers can access all the memory locations of a computer system. For example, in one architecture of a user computer system such as the multimedia console 100 in FIG. 2A, the boot software cannot access a hard disk such as media disk 144 in the boot process so software for checking or provisioning privilege on resources which the boot software loads must be stored in memory accessible by the boot software. For example, the privilege check or provisioning code may be part of the boot software itself.

Furthermore, data items such as unique identifiers, the privilege set identifier, and a privilege set key used as part of different implementation examples for requesting or checking privilege to access a pre-release resource may also be accessible at different operational layers for the privilege check software in those layers to access them.

Additionally, a pre-release to the boot software may need to be loaded via a removable memory medium such as a memory stick, flash card, DVD or CD. Multiple copies of privilege checking software may exist in various memory locations in a user computer system, depending on which operational layer, boot, hypervisor, system or application may be doing the privilege checking or provisioning.

Figure 3A:
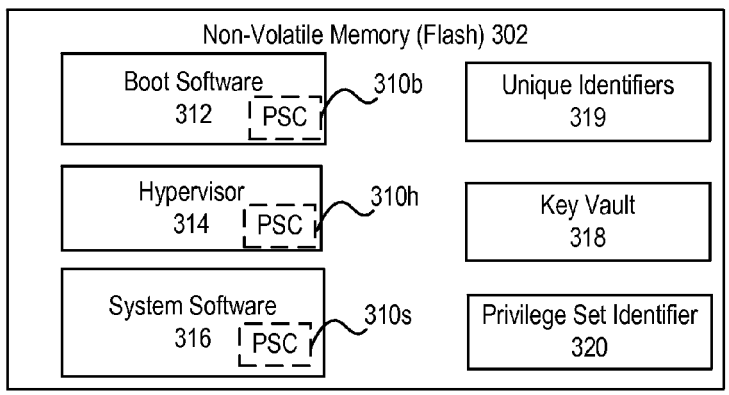
FIG. 3A illustrates an example of operational layers of software which can perform privilege checking and are stored in non-volatile memory.

FIG. 3A illustrates an example of operational layers of software stored in an exemplary non-volatile memory 302 which is flash memory in this example. The memory 302 represents non-volatile memory which may be located in different areas of the computer system. For example, boot software 312 in the multimedia console 100 example of FIG. 2A may be stored in ROM 106 or, as illustrated as BIOS 233 in ROM 231 in the computer 210 example of FIG. 2B. The boot software 312 includes software 310b, referred to for convenience of reference only as privilege set check software. For updates to the boot software itself or a hypervisor, operating system or other system software the boot software may load, the privilege set check software 310b may obtain membership in a privilege set and verify membership before loading such software for execution.

Also stored in memory 302 for access even at the boot software layer are one or more unique identifiers 319 for the individual computer system. Also stored in memory 302 are a key vault 318 which may include keys set in the manufacture of the computer (100, 210) like a manufacturer's key, one or more keys unique to the user computer system, and other keys which may be subsequently uploaded. A privilege set identifier 320 is also stored in memory 302 which indicates one or more privilege sets of which the user computer system (100, 210) is a member. In one example, the privilege set identifier is a bit field and one or more bits set to a certain value can be used to indicate set membership. In a bit field example, a bitmask can be used to conveniently update set membership to access a pre-release resource without disturbing other memberships indicated in the bit field.

The privilege set identifier can be protected by one or more security features. For example, the privilege set identifier may be included with the data and/or code of software that is otherwise cryptographically integrity protected. In another example, the privilege set identifier 320 can be stored in protected non-volatile memory. In another example, a cryptographically protected certificate (e.g. asymmetrically signed) for a specific instance of a user computer system that includes the privilege may be used. An example of protected non-volatile memory is memory only accessible by a hypervisor.

Other operational layers of software in this embodiment include a hypervisor 314 stored in non-volatile memory, for example in ROM 106 in FIG. 2A which the boot software 312 can cause to be executed by the processor 101 or may load into system memory 143 in other examples. Sometimes a hypervisor is referred to as a virtual machine manager which controls allocation of the processor and resources (e.g. memory). A hypervisor may allow multiple operating systems to share single hardware and control allocation of resources between the operating systems.

As illustrated, the hypervisor 314 may also have a version of privilege set check software 310h for provisioning and check privilege for pre-release versions or updates of software the hypervisor may load. Similarly, system software 316 can also have a version of privilege set check software 310s to execute when the system software 316 loads software applications. An example of system software 316 is a kernel which may also be stored in ROM 106 and loaded into system memory 143 by the boot software 312 or hypervisor 314

The system software 316 and hypervisor 314 may access a privilege set identifier 320 or privilege set keys 326 which may be stored on disk (see FIG. 3B) rather then in ROM or flash. The hypervisor 314 and the system software 316 have access to a hard disk such as media drive 144 in FIG. 2A or memory interface 241 in FIG. 2B. Additionally, other disks such as via USB controller 128 in FIG. 2A or via removable non-volatile memory interface 250 in FIG. 2B are accessible by the hypervisor 314 and the system software 316.

In some examples, a "flash version" can be used to refer to version of software including the boot software, the hypervisor and the system software.

Often pre-release software is an update, a fix, or an enhancement to an application, for example, a gaming application. Software and data items which are part of the pre-release software when downloaded for an application may perform at least part of the privilege checking before continuing execution.

Figure 3B:
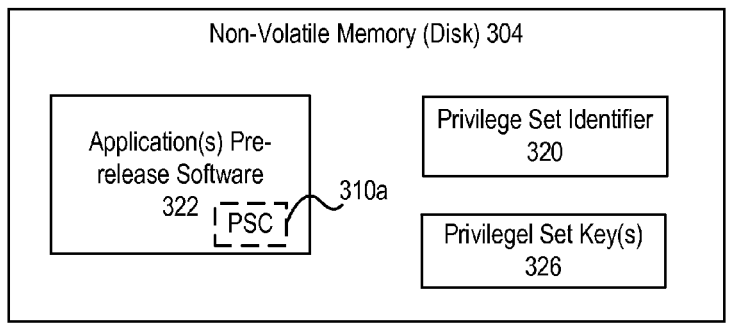
FIG. 3B illustrates an example of privilege checking software stored as part of a software pre-release application in a non-volatile memory.

FIG. 3B illustrates an example of privilege checking software 310a stored as part of a software pre-release application 322 in a non-volatile memory 304. In this example, memory 304 is a hard disk, but can be stored on a removable medium as well. The application pre-release software 322 can also be downloaded and include at least part of the privilege set check software 310a. Also stored in non-volatile memory 304 is a privilege set identifier 320 and at least one privilege set key 326.

As will be discussed in more detail below, some embodiments use security features as added protection that a privilege set identifier is received by the intended user computer system. Additionally, data items including resource privilege set identifiers associated with a resource are secured as well.

In some examples, a user may receive the secure data item including the privilege set identifier via another computer resource location, for example, via an e-mail the user accesses on a third party computer system rather than the user computer system. The user may then download the secure data item and in some cases the pre-released software or firmware onto a removable storage medium such as a compact disc, a memory stick, or a memory card and the like. For example, a new flash version including a pre-release boot version or hypervisor may be retrieved this way. A user can insert the removable medium in a removable media interface such as the USB controller 128 in FIG. 2A and the removable non-volatile memory interface 250 and the exemplar drives 253, 251 and 255.

Figure 3C:
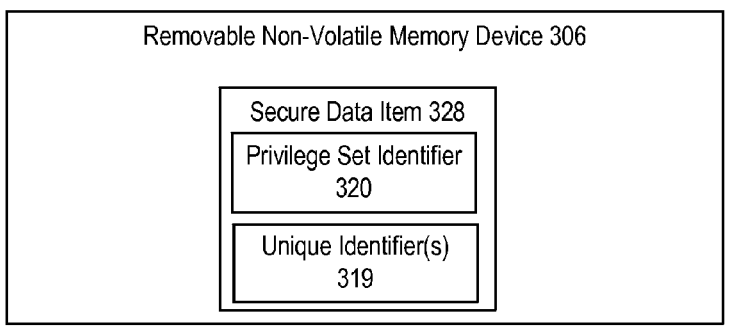
FIG. 3C illustrates an example of a removable storage medium storing a secure data item that can be used in one or more embodiments of the technology.

FIG. 3C illustrates an example of a removable storage medium 306 storing a secure data item that can be used in one or more embodiments of the technology. In this example, the secure data item 328 comprises the privilege set identifier 320 and one or more unique identifiers 319 for the user computer system. In some examples, the one or more unique identifiers can be numbers randomly generated by the user computer system using a pseudonumber generator. Additionally, the secure data item 328 can also include an encrypted privilege key for use in verifying resource or release privilege set identifiers.

Key based encryption schemes are often used to secure the privilege set identifier data items. Symmetric or shared key encryption can be used in which two communicating computer systems store the same key used for encryption. In some examples, different keys can be used, but there is a defined relationship between them so that one key can fairly easily obtain the other key from its key. In some examples, stream ciphers which encrypt one bit at a time may be used. In other examples, block ciphers are used which output encrypted data of a length which differs from the input length of the unencrypted data. Some examples of standards for block ciphers are those based on and derived from the Data Encryption Standard (DES) and the International Data Encryption Algorithm (IDEA).

Asymmetric encryption such as the widely used public key encryption can also be used. Two keys are involved. A public key is published by a first computer system for a second computer system to use to send data to it. A private key is known only to the first computer system. The keys may be related, but generally, it is very difficult to derive the private key from the public key using a defined relationship. The two keys, or the asymmetric encryption ciphers they are use with, are often reversible meaning the private key can be used to encrypt data which only the public key can decrypt and vice versa. Examples of ciphers that can be used are RSA and other Public Key Cryptography Standards (PKCS).

The reversibility of asymmetric encryption can also be used to verify identity as in the case of digital signatures. Message digest algorithms along with asymmetric encryption can be used to implement digital signatures. A message digest algorithm implements a hash function which is very difficult to invert thus, it is very likely a resultant hash value will be unique. A hash function takes input data of variable size and outputs a hash value (e.g. a string) of fixed length. Some examples of message digest algorithms are the secure hash algorithm (SHA) and MD2, MD4, MD5 and variants thereof.

In one example, a signed digital certificate may be created and verified as follows. A sender computer system generates a message digest, hash value, of the contents of the message, and encrypts the message digest using the sender's private key. A recipient computer system receive the message and decrypts the message digest using the sender's public key. The recipient computes the message digest. If the recipient's message digest or hash value does not match the decrypted message digest, the signature is not verified. Some examples of ciphers which may be used for generating and verifying digital signatures of certificates are RSA, the digital signature standard (DSS) and variants thereof.

In other examples, the secure data item can also be included in a security blob as described in RFC 2743.

Figure 4A:
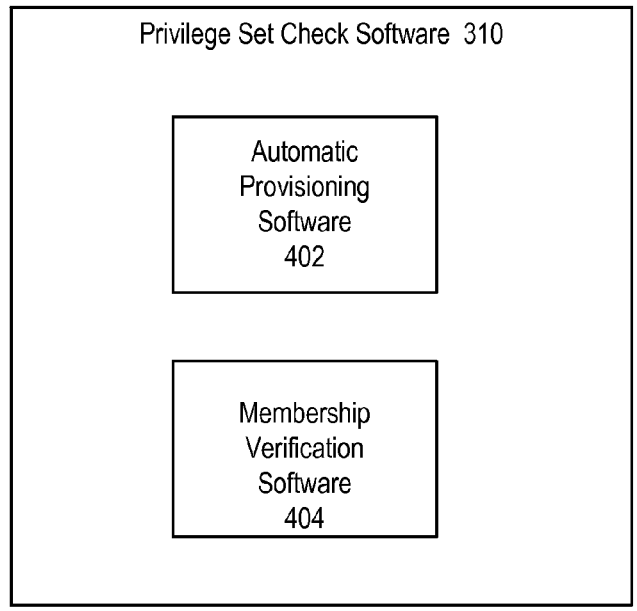
FIG. 4A illustrates an example of software components which may be included in a privilege set check software.

FIG. 4A illustrates an example of software components which may be included in the embodiments of privilege set check software 310 illustrated at the various operational layers in FIGS. 3A to 3C. Automatic provisioning software 402 performs processing for a request for a privilege set identifier for the user computer system to access a resource. Examples of such processing are described further in the discussion of the figures below.

In some instances, a user computer system will obtain the resource first, but the resource will not execute until the user computer system has membership in the privilege set. For example, a user may purchase or receive by postal mail or in a store a pre-release resource. In the case of software, the user may be able to download the pre-release software but not be able to execute it without requesting membership in the same privilege set as the software from an authorization computer system. In other cases, downloading the software or firmware may not be permitted until the user computer system's privilege set identifier has been updated to indicate membership in the appropriate privilege set. Also, in some embodiments, a user can request membership in a certain privilege set without selecting a particular resource at the time of request.

The membership verification software 404 verifies that a specific resource and the user computer system share the same membership before execution of the resource is permitted. Examples of such processing are described further in the discussion of the figures below.

Figure 4B:
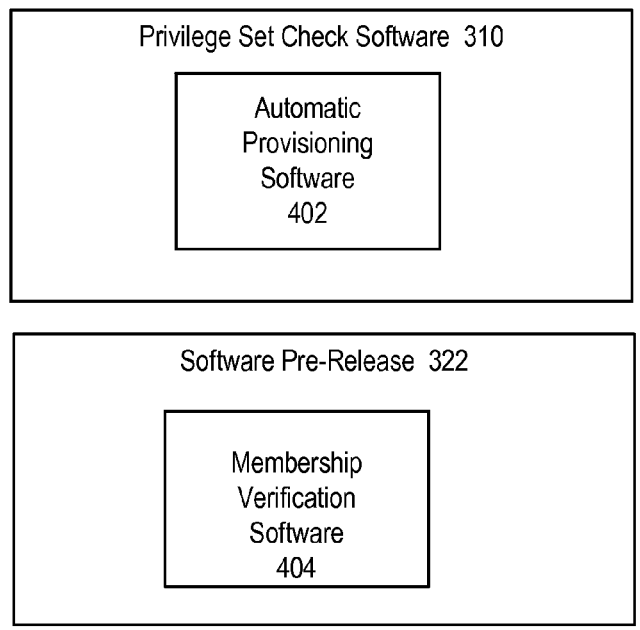
FIG. 4B illustrates another example of software for privilege set checking which may be included at least in part a downloaded software pre-release.

FIG. 4B illustrates another example of software for privilege set checking which may be included at least in part in a downloaded software pre-release. In this example, the membership verification software 404 is included in the downloaded software pre-release 322. In other examples, the pre-release may also include the provisioning code too.

An entity providing the pre-release resources provides hardware and software for communication with user computer systems for automatic provisioning into privilege sets. For example, for the gaming console 12 of FIGS. 1A and 1B, the entity may be an online gaming service accessible via the Internet by embodiments of a computing environment 12 for the console. Additionally, the entity provides hardware and software resources for tracking which pre-release resources are members in which privilege sets and for determining which user computer systems qualify for membership in which privilege sets as well. The entity's computer system may also assign security risk levels based on logic and input data such as the security risk factors mentioned above. Example embodiments of these hardware and software components is described in FIGS. 5A and 5B.

Figure 5A:
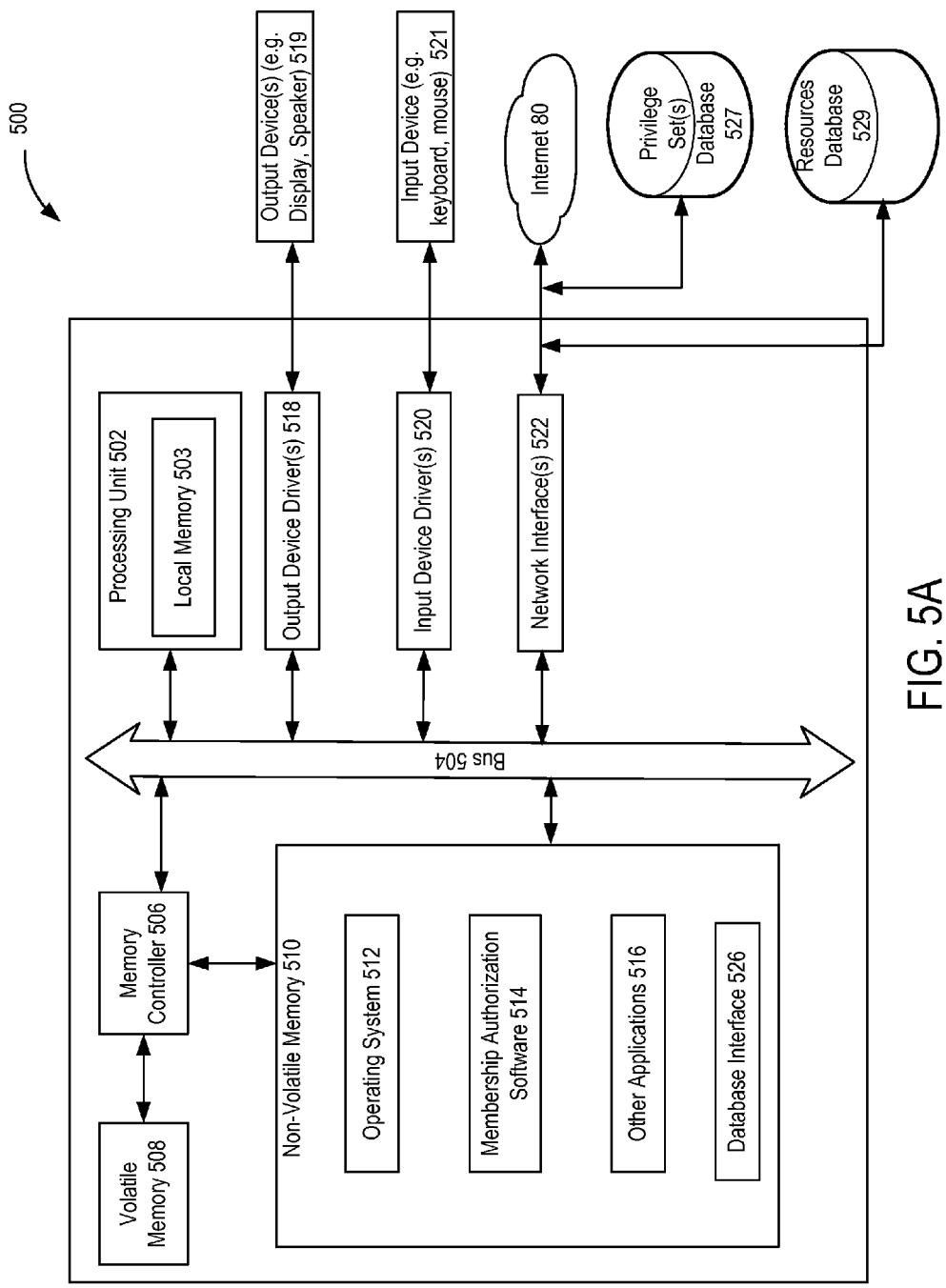
FIG. 5A illustrates an example embodiment of a system architecture for a membership authorization computer system including hardware and software components.

FIG. 5A illustrates an example embodiment of a system architecture for a membership authorization computer system including hardware and software components. The system 500 comprises a processing unit 502 which can comprise one or more processors and includes local memory 503, which can embody various cache designs.

Communication bus 504 provides a communication path between the various system components. For example, the bus 504 provides the processing unit 502 with access to memory controller 506, which controls access in this example to volatile memory 508 and non-volatile memory 510. Some examples of such non-volatilely stored data are applications such as an operating system 512, membership authorization software 514, a database interface 526 for accessing via the network interface(s) 522 databases such as the privilege set database 527 discussed in more detail below and the resources database 529 which stores software and firmware pre-releases, and other software applications 516. These are just examples of items that can be stored in non-volatile memory 510 and the memory of course comprises other data and software.

The system 500 further comprises one or more output device drivers 518 to control output devices 519, for example a display and audio output devices and at least one input device driver 520 for interpreting input from input devices 521 like a keyboard and pointing device.

One or more network interface(s) 522 are also provided so that the membership authorization computer system 500 can communicate with one or more computer networks such as over the Internet 80 or access the one or more databases 527, 529 over an internal network. The interface(s) 522 can include wired, wireless or both.

Figure 5B:
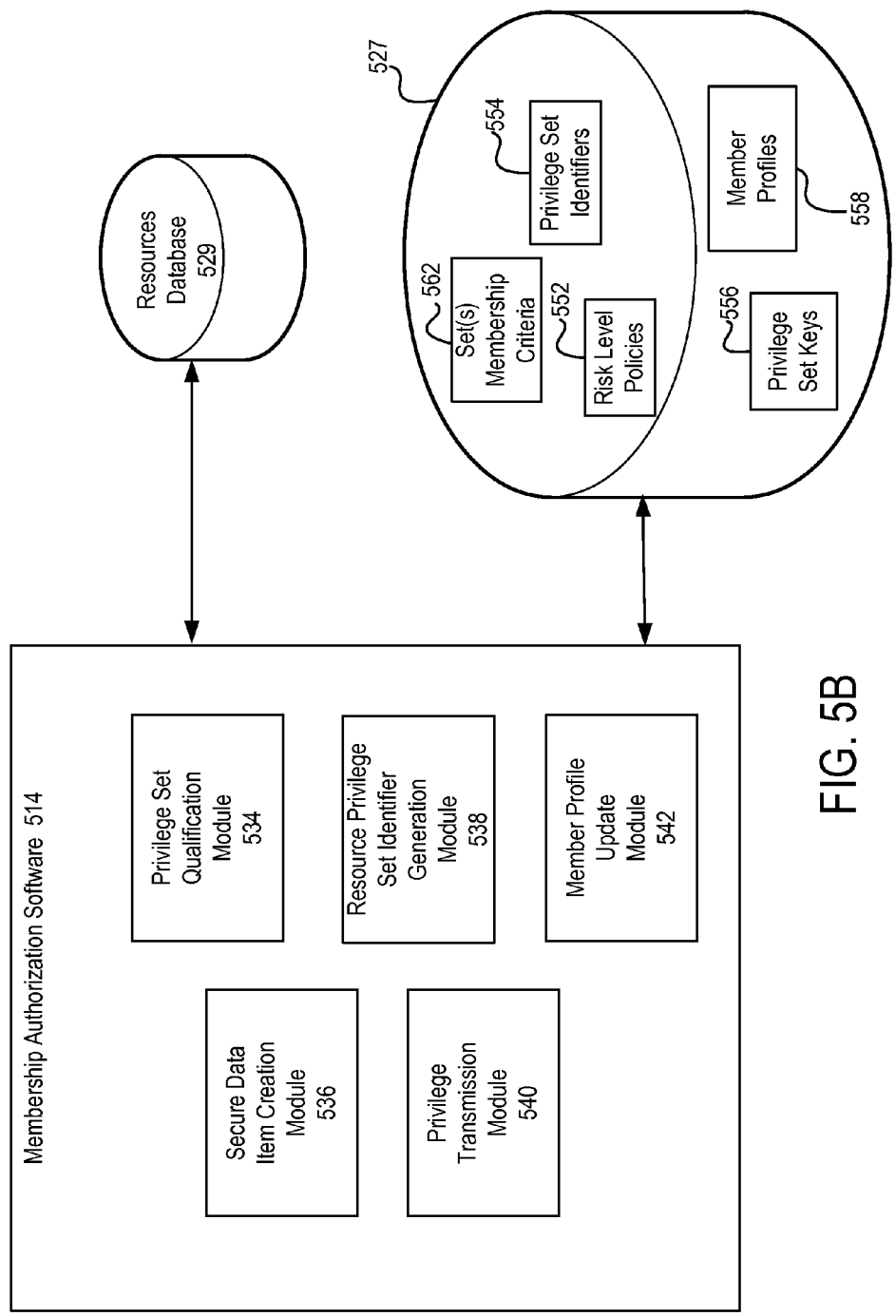
FIG. 5B illustrates an example of software components and data items which may be included in or utilized by a membership authorization software application.

FIG. 5B illustrates an example of software components and data items which may be included in or utilized by a membership authorization software application 514. Many of these data items may be stored in a database like an embodiment of the privilege set database 527 which is illustrated in more detail in FIG. 5B.

Each privilege set is associated with a security risk level. In this embodiment, a security risk level may be defined in a risk level policy data item 552. Alternatively, a security risk level policy 552 for each set may be stored. Privilege set identifiers 554 and privilege set keys 556 may be linked to the risk policies. An example of a risk includes the limit on the number of user computer systems allowed in the set in order to limit the number of user systems that would be affected by an integrity failure. For example, the risk pool or audience size for beta release of a software gaming application may be limited to 500,000 computer systems out of a possible 50 million. A boot software update may be limited to 5000 user computer systems. Other risk factor examples include the level of testing and certification success performed for the pre-release resource, and the operational layer of the user computer system which would have its functioning be affected by a failure of the pre-release resource.

Set membership criteria 562 comprises the criteria to be satisfied in order to be granted membership in a privilege set. One example is whether the limit on the number of users or user computer systems in the set has been reached. In another example, a user computer system must possess a required resource. An example of a required resource is a particular version or versions of a computing resource, for example a kernel or hypervisor, as indicated by a version number or range of version numbers. For example, the user computer system may lack boot software updates which the user computer can remedy by updating itself with the latest version of the flash software.

Privilege set identifiers 554 are set to indicate specific privilege set membership for resources and user computer systems. At least one privilege set key 556 is identified for each privilege set. In the case of public-private key pairs, the privilege set key may be a public key for a private key stored only at the user computer system or may be a private key paired with a public key sent to the user computer system. Member profiles 558 of user computer systems include unique identifiers for the systems, version numbers of resources on the user computer system, and links to one or more privilege set identifiers and one or more privilege set keys sent to identifier membership in different sets.

The software components in FIG. 5B use the data in the privilege set database 527 to perform their various functions. The privilege set qualification software 534 determines when a user computer system can be a member of the same privilege set as the resource based on privilege set membership criteria 562. The qualification software 534 notifies the member profile update software 542 of the new member, and the member profile update software 542 prepares a profile. The secure data item creation module 536 creates a secure data item such as secure data item 328 illustrated in FIG. 3C. The privilege transmission module 540 distributes the secure data item including the privilege set identifier in to the user computer system responsive to the user computer qualifying for membership.

The resource privilege set identifier generation software 538 generates a resource privilege set identifier for the resource based on the assigned privilege set of the resource which may be stored in a profile for the resource stored in the resources database 529. The resource profile in database 529 is updated to include the resource privilege set identifier. The generation software 538 also inserts this identifier in the resource in some cases or sends separately via the privilege transmission module 540 to a user computer system.

FIGS. 6 through 13 are discussed in terms of the embodiments of FIGS. 2A to 5B for an illustrative context although other computer system embodiments can implement the methods of FIGS. 6 through 13 as well.

Before a user computer system can request membership in a set, an entity such as an online gaming service must set up the privilege sets, make membership criteria and security risk levels available such as per a database like the privilege set database 527 to software for automatically managing the privilege sets on the entity side.

FIG. 6 is a flowchart of an embodiment of a method 600 for automatically provisioning privilege sets. A remote membership authorization computer system like system 500 in FIG. 5A and its software such as the membership authorization software 514 may implement this method. The discussion of FIG. 6 references the membership authorization software 514 and its sub-modules for an illustrative context only. In step 602, the resource privilege set identifier generation module 538 identifies the assigned security risk level for a computing resource and associates, in step 604, the resource to a privilege set based on the identified security risk level. In one example, the security risk level can be determined and assigned by software such as the privilege set identifier generation module 538. In one example, entity personnel may have entered metadata for a resource indicating the security risk level via an input device 521 which the generation module 538 stored in the resource database 529. In another example, meta data may have been entered for a resource such as a risk pool size, the type of the resource being modified by the pre-release resource, or a level of certification testing success. Based on a weighting of the risk factors, the privilege set identifier generation module 538 may apply logic to assign a security risk level to the resource. The generation module 534 then generates a resource privilege set identifier for the resource identifying it as a member of the privilege set.

The privilege set qualification software 534 receives a request for access to the resource for the remote computer system in step 606. In this embodiment, the request comprises one or more unique identifiers for the user computer system. These unique identifiers are useful for security purposes and to track the membership of different user computer systems in different sets.

The privilege set qualification software 534 determines in step 608 whether the requesting user computer system qualifies for membership in the same privilege set of the resource. For example, from the provided one or more unique identifiers, the qualification software 534 can determine what versions or updates of necessary flash software or other application software the user computer system has or lacks. The qualification software 534 can also determine whether the limit has been reached for the audience or risk pool size for the privilege set.

Responsive to the user computer system qualifying for membership, the privilege transmission module 540 distributes in step 610 a privilege set identifier indicating membership in the set of the resource to the user computer system. If a user computer system does not qualify for access, the qualification software 534 can send in step 612 a message to the user computer system indicating access to the resource has been denied. The message may indicate the reason for denial such as the lack of an update or version of a resource, so the user can remedy that and try again to register as a member.

As illustrated in the more detailed implementation examples below, the secure data item creation module 536 may be used by the privilege set qualification software 534, the resource privilege set identifier generation module 538, or the privilege transmission module 540 to secure the privilege set identifier for a user or a resource in a secure data item.

FIG. 7 is a flowchart of an embodiment of a method for associating a resource to a privilege set which may be used to implement step 604. In step 702, the secure data item creation module 536 generates a secure data item including the resource privilege set identifier and in step 704 includes the secure data item in the resource. For example in a software pre-release, the secure data item is stored in data or bits which are part of the pre-release software.

Figure 8:
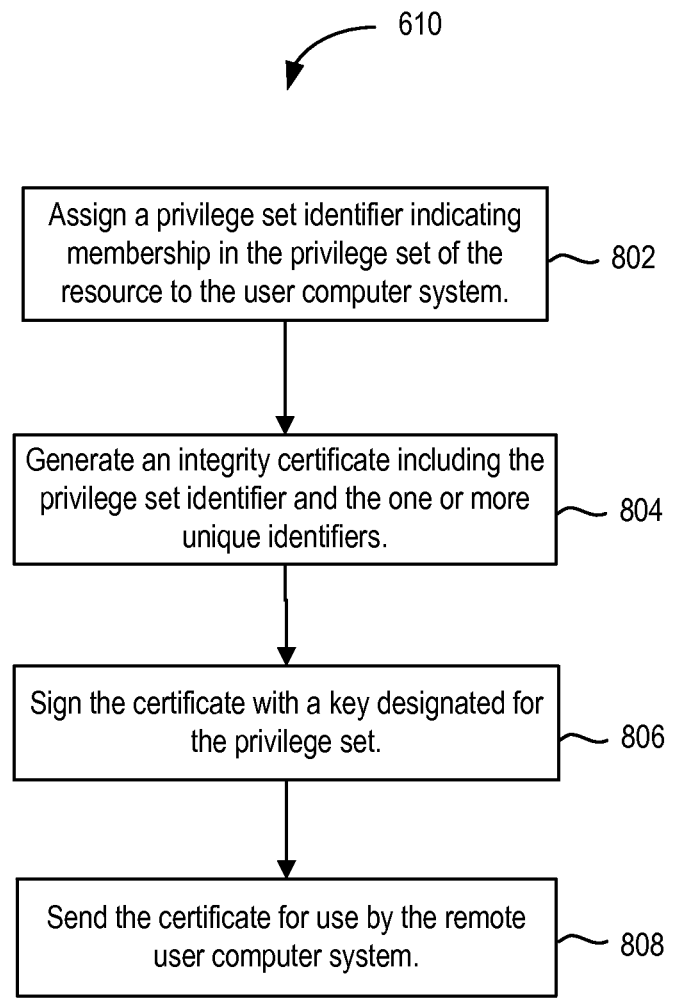
FIG. 8 is a flowchart of an embodiment of a method for distributing a privilege set identifier indicating membership to a user computer system.

FIG. 8 is a flowchart of an embodiment of a method for distributing a privilege set identifier indicating membership to a user computer system as may be used to implement step 610 in FIG. 6. If the user computer system qualifies, the qualification software 534 assigns in step 802 a privilege set identifier indicating membership in the privilege set of the resource to the user computer system. The software 534 sends a message to the secure data item creation software 536 indicating the assignment. The secure data item 804 generates in this example an integrity certificate including the privilege set identifier and the one or more unique identifiers in this example.

In one embodiment, the privilege sets have positions in a hierarchy. In some examples, membership in a privilege set provides access not only to resources associated with that privilege set, but also to resources associated with privilege sets considered to have lower or less privilege. In step 806, the secure data item creation modules signs the certificate with a key 556 designated for the privilege set of the assigned privilege set identifier. The secure data item creation module 536 alerts the privilege transmission module 540 that the secure data item, in this case the signed certificate can be transmitted, and the privilege transmission module 540 in step 808 sends the certificate for use by the remote user computer system.

The user computer system also includes software for requesting and automatically provisioning its system as a member of a privilege set in order to gain access to a pre-release computing resource. In the provisioning processing, the user computer system communicates with a remote computer system of the entity controlling the resource to gain membership in the privilege set and, hence, permission or the privilege to access the resource. An example of accessing a resource is executing the resource. The user computer system performs the verification locally of its own privilege to execute a resource. FIGS. 9 through 13 provide details of embodiments of methods related to the user computer attempting to access a pre-release resource associated with a privilege set. For illustrative context only, FIGS. 9 through 13 are discussed in the context of the privilege set check software 310 and its automatic provisioning software 402 and, additionally, the membership verification software 404 of the software pre-release 322 of FIGS. 4A and 4B. Of course, the methods may be performed in user computer systems with different configurations of hardware and software.

Figure 9:
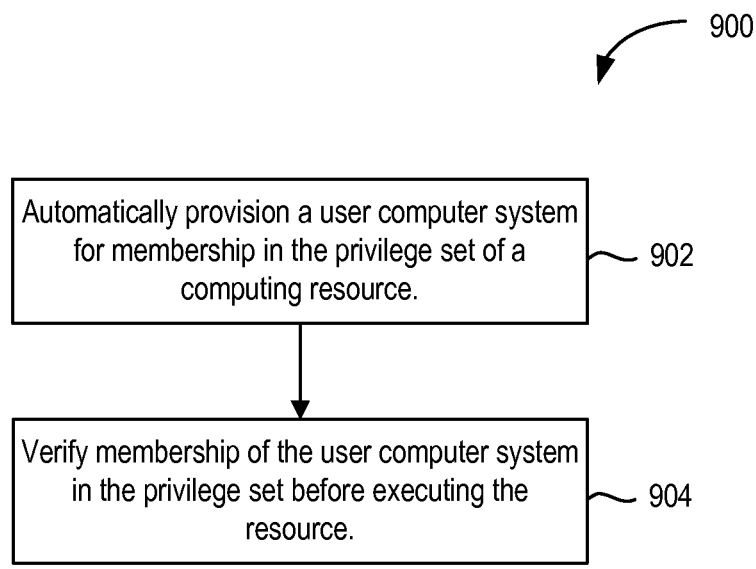
FIG. 9 is a flowchart of an embodiment of a method for a user computer system to access a pre-release computing resource associated with a privilege set.

FIG. 9 is a flowchart of an embodiment of a method for a user computer system accessing a pre-release computing resource associated with a privilege set. When a user computer system attempts to register for membership in a privilege set, the user computer system performs processing in order to receive, validate and store the privilege identifier in order to access resources such as higher risk pre-release software.

The pre-release resource, such as a beta software release, has a higher risk for a security exploit due to less testing, for example, than software available to the general public. Another factor contributing to a higher risk security level is the extent of damage to the user computer system due to the operational layer of the user computer system affected by the requested pre-release resource. For example, a beta flash release with changes to the boot software, hypervisor software or kernel software can cause a catastrophic failure of the user computer system.

As an exemplary context, user input to the user computer system such as multimedia console 100 or computer system 210 indicates a request to download a prototype upgrade to a gaming application. In step 902, the privilege set check software 310 executing on a processor 101, 220 of the user system automatically provisions the user computer system for membership in the privilege set of a computing resource. If the provisioning is successful, in step 904, the privilege set check software 310 verifies membership of the user computer system in the privilege set before executing the resource. In another example, the resource is the software prototype 322 and its membership verification software 404 executing on the user computer system performs, at least in part, the verification of step 904.

Figure 10:
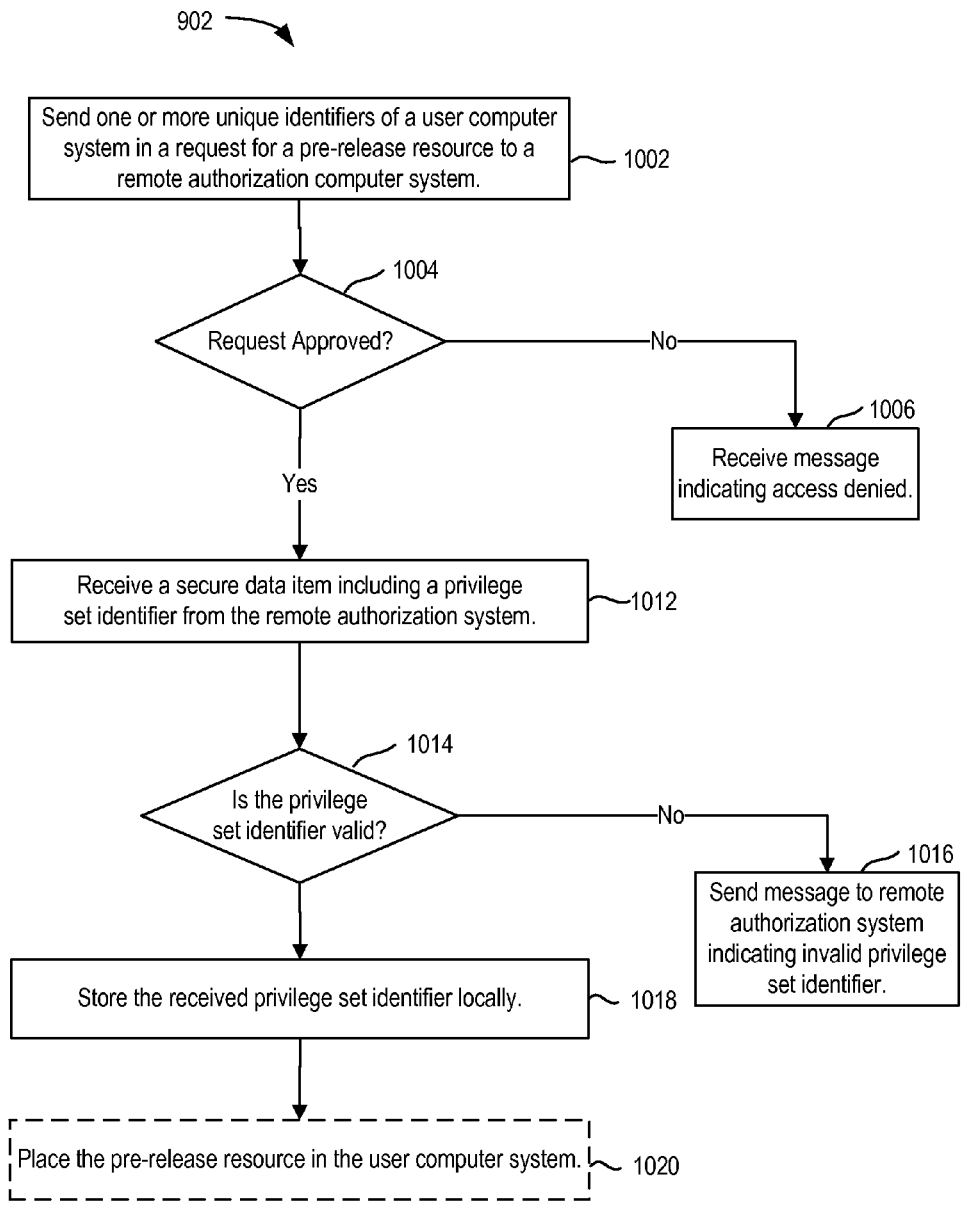
FIG. 10 is a flowchart of an embodiment of a method for automatic provisioning by a user computer system to obtain membership in a privilege set.

FIG. 10 is a flowchart of an embodiment of a method for automatic provisioning by a user computer system to obtain membership in a privilege set that may be used to implement step 902. The automatic provisioning software 402 sends in step 1002 one or more unique identifiers of a user computer system in a request for a pre-release resource to a remote authorization computer system. The automatic provisioning software 402 determines in step 1004 whether the request was approved or not based on a received message. If the request was not approved, in step 1006 the automatic provisioning software 402 receives a message indicating access is denied. As previously mentioned, the message may indicate a reason for denial such as lacking a software update which the user can then download and try to register again.

In step 1012, the automatic provisioning software 402 receives a secure data item including a privilege set identifier from the remote authorization system 500 and in step 1014 determines whether the privilege identifier is valid. If not, a message to the remote authorization system is sent in step 1016 indicating the received privilege set identifier is invalid. Some examples of the basis for invalidity are a failure to decrypt the privilege set identifier, at least one unique identifier which does not match the unique identifier sent, or other mismatch between data items in the secure data item.

In other examples, the secure data item may be sent to a user via a computer system other than the user computer system. For example, a security blob or certificate including the privilege set identifier may be sent to an e-mail address. The user can then download the secure data item 328 onto a removable storage medium 306 as in the example of FIG. 3C. The user inserts the removable storage medium 306 into the user computer system, and the automatic provisioning software 402 reads the secure data item from the removable storage medium 306.

Responsive to the privilege set identifier being valid, the automatic provisioning software stores in step 1018 the received privilege set identifier locally in a memory (e.g. of the user computer system.) Optionally, at this point, the resource may be placed in step 1020 in the user computer system. In the case of firmware, the firmware may be downloaded, and the computer system restarted again for recognition by the boot software. In the case of software, the software may be placed by downloading the software to the user computer system, and a privilege set check may be performed by the kernel, for example, in response to a user request to execute the software.

Particularly in the case of software and firmware, the resource may be downloaded first, and then the provisioning of the user computer system performed to see if the system can access the resource if the system does not already have a privilege set identifier which permits access the resource. In other cases, the privilege set identifier must be obtained even to download the software or firmware.

Figure 11:
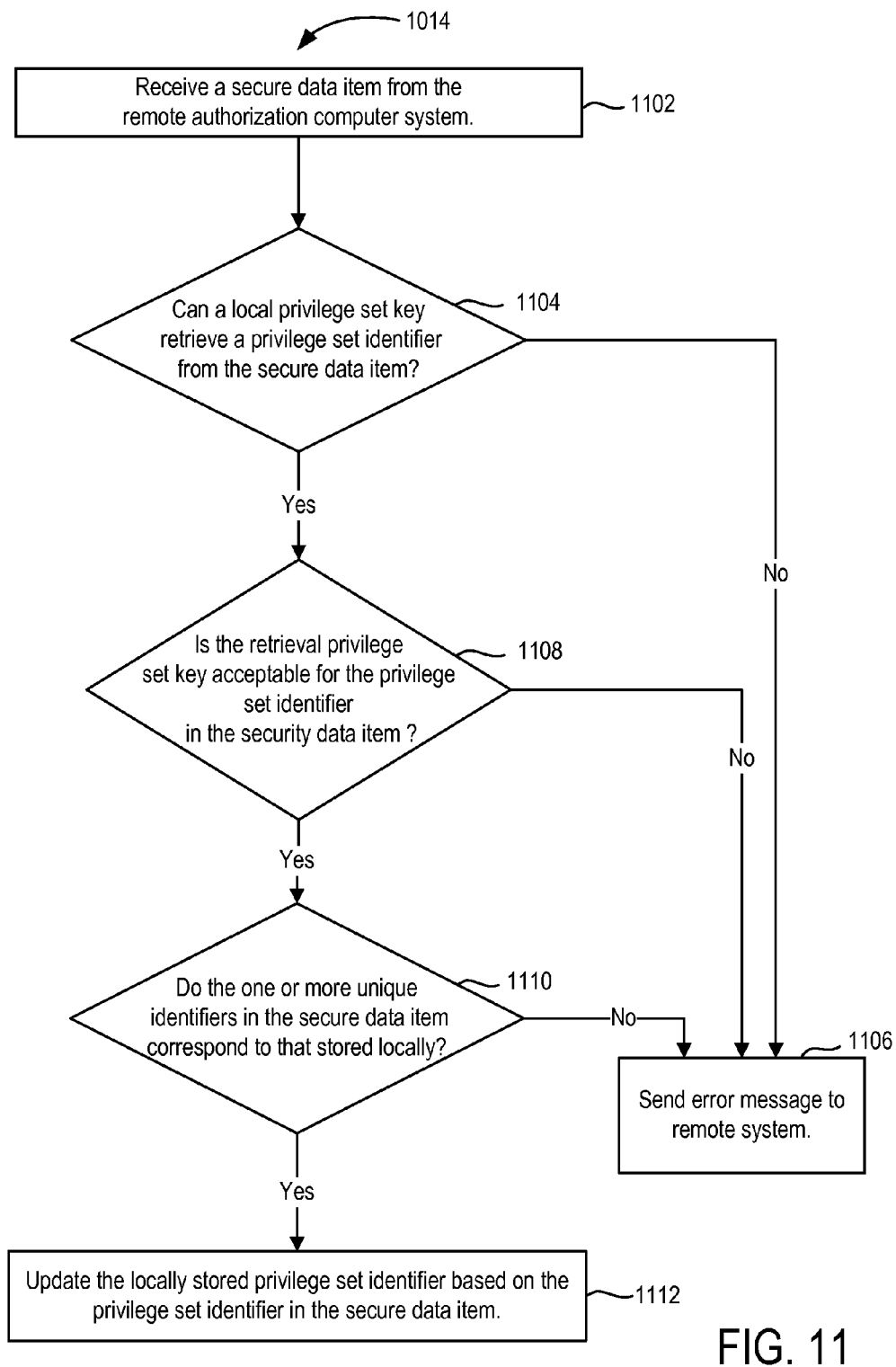
FIG. 11 is a flowchart of an embodiment of a method for determining the validity of a privilege set identifier received from a remote authorization computer system.

FIG. 11 is a flowchart of an embodiment of a method for determining the validity of a privilege set identifier received from a remote authorization computer system which may be used to implement step 1014 of FIG. 10. The automatic provisioning software 402 receives the secure data in step 1102 from the remote authorization computer system and determines in step 1104 whether a local privilege set key can retrieve a privilege set identifier from the secure data item. If not successful in retrieving the privilege set identifier, the provisioning software 402 sends an error message to the remote authorization system 500 in step 1106.

In this embodiment, the locally stored privilege set key maybe a private key corresponding to a public key the user computer system sent as a unique identifier. Conversely, the privilege set key may be a public key corresponding to a private key the user computer system sent as a unique identifier or a shared key with the remote authorization system 500. Additionally, the remote authorization system 500 may send an encrypted privilege set key prior to sending the secure data item. The provisioning software 402 decrypts and stores this sent key locally for use when the secure data item including the privilege set identifier is received. As shown in FIGS. 3A, 3B and 3C, some keys are accessible in the key vault 318 to lower layer software such as the boot software 312, the hypervisor 314 and the system software 316, and others can be stored at the application layer as in FIG. 3B.

As previously mentioned, there can be a hierarchy of privilege sets in one embodiment. Position in the hierarchy correlates to degree of privilege for a set. Different security measures can be used to protect or secure privilege set identifiers of privilege sets at different positions in the hierarchy. For example, a key for the privilege set or the identifier itself may be included with the data and/or code of software that is otherwise cryptographically integrity protected. In the example below, different signing keys can be associated with different privilege sets. For example, a key unique to the user computer system which is only known to that unique user computer system may be used to protect the integrity. Different privilege set identifiers representing different levels of privilege can be stored in memory locations with different protection levels, typically corresponding to the risk levels of the privilege sets in the hierarchy.

Different locally stored keys can be designated for decrypting a privilege set of a certain privilege level by the automatic provisioning software 402. If the key can be retrieved, an additional security check is performed in step 1108 to determine if the retrieval privilege set key has an acceptable privilege level for the privilege set identifier in the secure data item.

For example, the automatic provisioning software 402 may try different keys in an order, for example highest privilege designated key to lowest privilege designated key until retrieval success or no more keys are available to try. In another instance, the privilege level for the resource was identified previously in the exchange of the request, and the key designated for that privilege level is tried first. In one example, if the privilege level of the privilege set identifier is different from the privilege level of the retrieval key, the retrieval privilege set key does not have the acceptable privilege level for the privilege set identifier. The result is that the identifier is deemed to be invalid, and the provisioning software 402 sends an error message to the remote authorization system 500 in step 1106.

If the retrieval key is of an acceptable privilege level for the privilege set identifier, as another validity check, the automatic provisioning software 402 in step 1110 determines whether the one or more unique identifiers in the secure data item correspond to those stored locally and previously sent. For example, an identifier being the same as that sent can evidence correspondence. In other examples, correspondence is shown if the unique identifier is a corresponding member of a pair or a derived value of a stored unique identifier. If there is a mismatch with at least one of the one or more unique identifiers, the provisioning software 402 sends the error message in step 1106. If the one or more unique identifiers all correspond, the provisioning software 402 updates the locally stored privilege set identifier based on the privilege set identifier in the secure data item in step 1112. In one example, the privilege set identifier can be a bit field in which individual bits are set to predetermined specified values to indicate membership in the privilege set. One convenient way of verifying membership in a privilege set is by applying a bitmask to see if the bit or bits for that privilege set are set to specified values. Additionally, a locally stored privilege set identifier with membership in other sets can be conveniently updated to identify the latest membership obtained in the automatic provisioning by applying a bitmask that only changes the bits that need to be updated.

Furthermore, in some embodiments, the secure data item includes a new privilege set key from the authorization system 500. This privilege set key has a privilege level for the set identified in the privilege set identifier. This key can also be stored locally in the user computer system, for example in the key vault 318 or in a data storage location 326 on disk. In one example, the privilege set key can be a private key in a public private key pair.

In one embodiment, the privilege set identifier grants the user computer system integrity check permission to access all resources associated with the privilege set indicated in the privilege set identifier. For example, once a user computer system has membership in the privilege set, in requests to download or otherwise obtain other resources associated with the same set, the user computer system does not need to go through a provisioning method to obtain another privilege set identifier.

Figure 12:
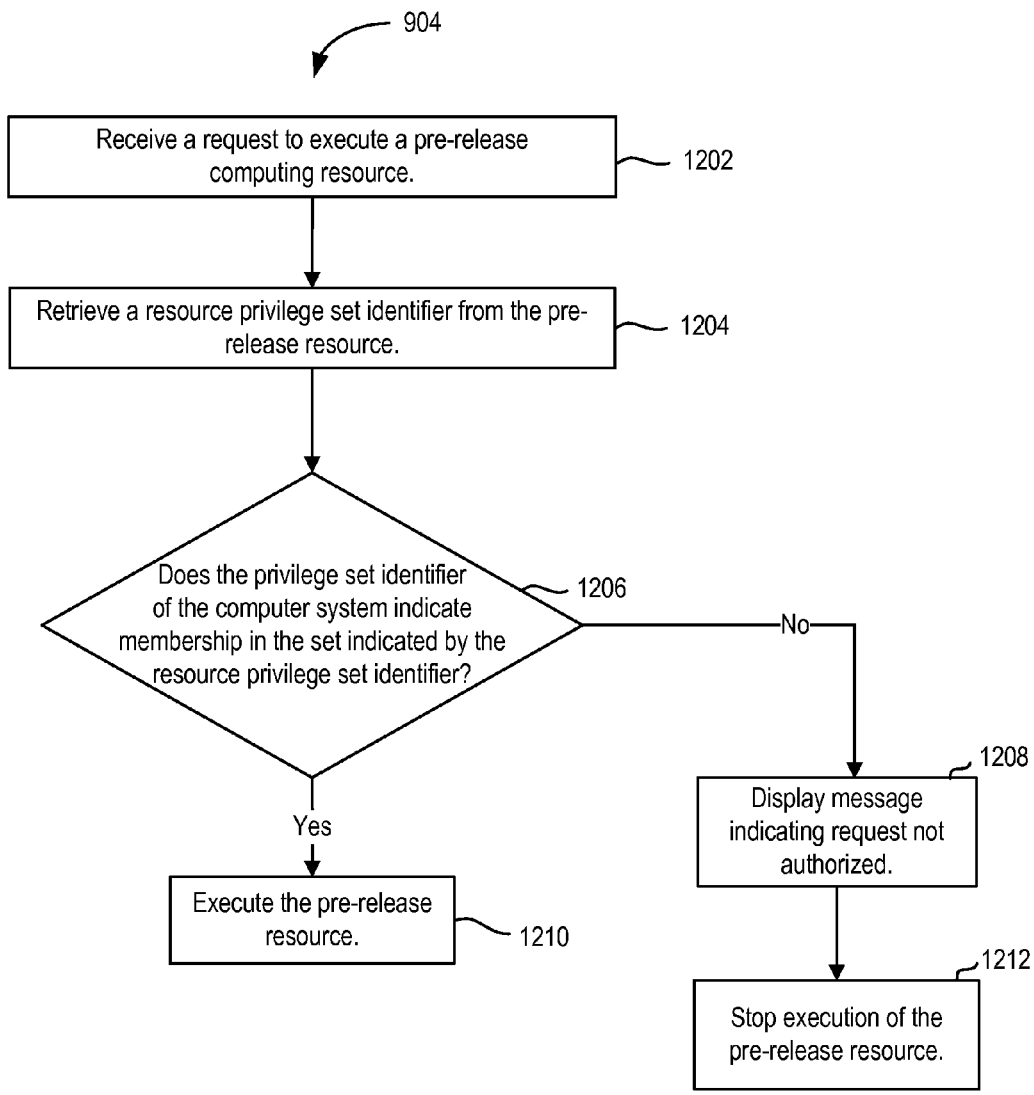
FIG. 12 is a flowchart of an embodiment of a method for verifying membership of the user computer system in the privilege set associated with a pre-release resource.

FIG. 12 is a flowchart of an embodiment of a method for verifying membership of the user computer system in the privilege set associated with a pre-release resource as may be used to implement step 904 of FIG. 9. Depending on the operational level of the pre-release resource, an operational layer of software, e.g. boot, hypervisor, or kernel, will receive a request to execute the pre-release computing resource in step 1202.

Membership verification software 404 in step 1204 retrieves a resource privilege set identifier from the pre-release resource, and in step 1206 determines whether the privilege set identifier of the computer system indicates membership in the set indicated by the resource privilege set identifier. For example, the verification software 404 can compare them to see if the same bit fields are set to indicate membership. If the user computer system and the resource are not members of the same privilege set, the membership verification software 404 displays in step 1208 a message indicating the request to execute the resource is not authorized. Furthermore, the verification software 404 in step 1212 stops execution of the pre-release resource. For example, a beta release update to a game application will not execute.

If the privilege set identifiers indicate the resource and user computer system are members of the same privilege set, control is returned to the operational layer of the user computer system which controls the pre-release resource, which in step 1210 is executed. For example, if the user computer system has the privilege to execute a hypervisor patch or other distribution of beta bits or data downloaded for the hypervisor, the privilege check software 310b of the boot software 312 returns control to the boot software that called it and which changes control to the hypervisor load code of the boot software 312.

FIG. 13 is a flowchart of another embodiment of a method for determining whether a user computer system and a pre-release resource share membership in the same sets may be used as one example for implementing step 1206 of FIG. 12. The membership verification software 404 determines in step 1302 whether a privilege set key signed an integrity certificate including the resource privilege set identifier. If the certificate was not signed by a privilege set key, the method returns to steps 1208 and 1212.

If the certificate was signed by a privilege set key, the verification software 404 determines in step 1306 whether the signature privilege set key is of an acceptable privilege level for the resource privilege set identifier. For example, a key for a lower privileged set decrypting a resource privilege set identifier indicating membership in a higher privileged set identifies an invalid certificate. If the signature key lacks the requisite privilege, the method returns to steps 1208 and 1212.

In step 1308, the membership verification software 404 determines whether the privilege set identifier of the computer system indicates membership in the set indicated by the resource privilege set identifier. For example, in the case where privilege set membership is indicated by one or more bits being set in a bit field, a bitmask can be applied to compare the two identifiers to see if the designated bits are set to values indicating membership. Again, if the determination is that the resource and the user computer system do not share membership in the same set, the method returns to steps 1208 and 1212.

If the resource and user system are members of the same set, the verification software 404 or some other code of the privilege set check software 310 determines whether any expiration criteria in the integrity certificate is satisfied in step 1310. If the expiration criteria is not satisfied, the method returns to steps 1208 and 1212. If the expiration criteria is satisfied, the method returns to step 1210 and executes the pre-release resource.

In some examples, expiration criteria can be a time based criteria. For example, a set date can be supplied as the end date of execution for a software pre-release. In another example, the time based criteria can be a time period from a designated start time point, such as the time of download for a software pre-release. In other examples, the expiration criteria can be that the resource only works with certain versions of software and hardware components on the user computer system. For example, a beta boot software update may have expiration criteria of running on a version of the boot software of a previous public release. The user computer system can run the beta update as long as it stays with the previous release of boot software. However, the user must download a new publicly released version of flash software including the boot, hypervisor and system software in order to play new games on a gaming console like multimedia console 100. This limits the scope of risk as well in the time domain as the user will likely want to play new games.

The technology may be embodied in other specific forms without departing from the spirit or essential characteristics thereof. Likewise, the particular naming and division of modules, routines, features, attributes, methodologies and other aspects are not mandatory, and the mechanisms that implement the technology or its features may have different names, divisions and/or formats. Furthermore, as will be apparent to one of ordinary skill in the relevant art, the modules, routines, features, attributes, methodologies and other aspects of the embodiments disclosed can be implemented as software, hardware, firmware or any combination of the three. Of course, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of programming.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer readable storage media having encoded thereon instructions for causing at least one processor to perform a method for accessing a pre-release computing resource associated with a privilege set, the method comprising:
provisioning a user computer system for membership in the privilege set, the privilege set including a set of user computer systems and the pre-release computing resource and the privilege set having a security risk level indicating an operational layer of the user computer system which the pre-release computing resource changes, by
sending one or more unique identifiers of the user computer system in a request for the pre-release computing resource to the remote authorization computer system,
responsive to satisfying membership criteria for the privilege set, receiving and storing locally a privilege set identifier from the remote authorization system;
requesting from the remote authorization system and storing on the user computer system the pre-release computing resource;
verifying the user computer system has membership in the privilege set required for the resource based upon the privilege set identifier and a resource privilege set identifier for the resource, by
receiving a request to execute the pre-release computing resource,
retrieving the resource privilege set identifier from the locally stored pre-release computing resource, and
determining whether the locally stored privilege set identifier matches the locally stored resource privilege set identifier; and
responsive to the locally stored privilege set identifier matching the resource privilege set identifier, executing the pre-release computing resource.

2. The one or more computer readable storage media of claim 1, wherein the method further comprises that the privilege set identifier is received within a secure data item.

3. The one or more computer readable storage media of claim 2, wherein the secure data item is stored in protected non-volatile memory.

4. The one or more computer readable storage media of claim 2, further comprising:
the secure data item including a digital certificate;
verifying the signature of the certificate using by a privilege set key stored in the memory locally accessible by the user computer system;
determining whether the verification privilege set key is of an acceptable privilege level for the privilege set identifier responsive to verification of the signature by the privilege set key; and
storing the privilege set identifier in the memory locally accessible by the user computer system responsive to the verification key being of the acceptable privilege level.

5. The one or more computer readable storage media of claim 1, wherein:
verifying the user computer system has membership in the privilege set required for the resource further comprises verifying whether an integrity certificate including the resource privilege set identifier has been signed by a privilege set key stored in the memory locally accessible by the user computer system;
determining whether the signing privilege set key is of an acceptable privilege level for the resource privilege set identifier responsive to verification of the signature by the privilege set key; and
responsive to the signing key not being of the acceptable privilege level, stopping execution of the pre-release resource.

6. The one or more computer readable storage media of claim 5, further comprising:
the integrity certificate including expiration criteria; and
verifying the user computer system is authorized to access the pre-release computing resource based on the expiration criteria.

7. The one or more computer readable storage media of claim 1, wherein the privilege set identifier is a bit field with one or more predetermined bit values indicating membership in the privilege set.

8. The one or more computer readable storage media of claim 1, wherein the security risk level further indicates a limitation on the number of user computer systems at risk of an integrity failure of the resource.

9. The one or more computer readable storage media of claim 1, wherein the security risk level further indicates a level of security testing certification success for the pre-release resource.

10. A user computer system comprising:
a processor;
a communication interface accessible by the processor for communicating with a remote computer system for downloading a software pre-release associated with a privilege set, the privilege set including a set of user computer systems and the pre-release computing resource, and the privilege set having a security risk level of the software pre-release indicating an operational layer of the user computer system which the pre-release computing resource changes; and
a memory accessible by the processor, the memory storing software for programming the processor to obtain a privilege set identifier from the remote computer system and store the identifier in the memory and for storing the downloaded software pre-release;
the privilege set identifier indicating a membership of the user computer system in the privilege set, the membership granting permission to run the software pre-release;
the memory storing the software pre-release for programming the processor to verify the user computer system has membership in the privilege set associated with the downloaded software pre-release based on a match of the privilege set identifier and a resource privilege set identifier included in the downloaded software pre-release responsive to a request for execution of the software pre-release, and stopping execution of the software pre-release responsive to the user computer system lacking membership.

11. The system of claim 10 further comprising
a removable storage media interface accessible by the processor and wherein
the processor obtains the privilege set identifier from the remote computer system by reading a secure data item including the privilege set identifier for the user computer system from a removable storage medium connected to the removable storage media interface.

12. The user computer system of claim 10, wherein:
the security risk level additionally represents a level of security testing certification success for the pre-release.

13. The user computer system of claim 10, wherein:
the privilege set identifier for the user computer system has been included with the data and/or code of the software pre-release that is otherwise cryptographically integrity protected.

14. The user computer system of claim 10, wherein:
the privilege set is one in a hierarchy of privilege sets; and
at least two identifiers, each associated with a different privilege set in the hierarchy, are protected by different security measures.

15. The user computer system of claim 10, further comprising:
the memory storing one or more privilege set keys, each key having a privilege level indicating a position in a hierarchy of privilege sets;
the processor obtains the privilege set identifier in an integrity certificate and verifies the signature of the integrity certificate with at least one privilege set key;
the processor determining whether the at least one privilege set key is of an acceptable privilege level for the privilege set identifier in the integrity certificate responsive to successful verification of the signature; and
the processor storing the privilege set identifier in the memory responsive to the at least one privilege set key being of an acceptable privilege level for the privilege set identifier.

16. A method for automatic provisioning of privilege sets comprising:
associating a first pre-release computing resource with a first privilege set in a hierarchy of privilege sets by generating a resource privilege set identifier for the first pre-release computing resource, each privilege set in the hierarchy including a set of user computer systems and one or more pre-release computing resources having a security risk level defined for the level of each privilege set in the hierarchy, each security risk level indicating an operational layer of a respective computer system in the respective set of user computer systems which the respective one or more pre-release computing resources of the respective privilege set changes;
generating a privilege set identifier indicating membership in the first privilege set for each user computer system which satisfies membership criteria for the first privilege set;
distributing the privilege set identifier and the first pre-release computing resource to each user computer system which satisfies the membership criteria for the first privilege set;
determining whether the privilege set identifier matches the resource privilege set identifier for the first pre-release computing resource; and
responsive to the privilege set identifier matching the resource privilege set identifier for the first pre-release computing resource, executing the first pre-release computing resource.

17. The method of claim 16, wherein distributing the privilege set identifier and the first pre-release computing resource to each user computer system which satisfies the membership criteria for the first privilege set is independent of licensing the user computer system to use the resource.

\* \* \* \* \*